US009151823B2

(12) United States Patent
Lu et al.

(10) Patent No.: US 9,151,823 B2
(45) Date of Patent: Oct. 6, 2015

(54) WIRELESS COMMUNICATION DEVICE CAPABLE OF ACCURATELY PERFORMING POSITION ESTIMATIONS

(75) Inventors: Yan Lu, Cupertino, CA (US); Vladimir Belov, Union City, CA (US); Anning Chen, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 347 days.

(21) Appl. No.: 13/538,686

(22) Filed: Jun. 29, 2012

(65) Prior Publication Data

US 2013/0225208 A1 Aug. 29, 2013

Related U.S. Application Data

(60) Provisional application No. 61/602,999, filed on Feb. 24, 2012.

(51) Int. Cl.
*H04W 24/00* (2009.01)
*G01S 5/02* (2010.01)
*H04W 64/00* (2009.01)
*G01S 19/49* (2010.01)

(52) U.S. Cl.
CPC ............ *G01S 5/0252* (2013.01); *H04W 64/003* (2013.01); *G01S 19/49* (2013.01)

(58) Field of Classification Search
CPC .... G01S 5/0252; G01S 19/49; H04W 64/003; H04W 64/00; H04W 4/02; H04L 29/08657
USPC .............. 455/419, 462, 403, 557, 461, 456.6, 455/456.1; 370/349, 338, 331, 328, 329; 379/21, 29.01; 340/10.33; 701/472
See application file for complete search history.

(56) References Cited

U.S. PATENT DOCUMENTS

2002/0077060 A1  6/2002  Lehikoinen et al.
2006/0125694 A1*  6/2006  Dejanovic et al. ............ 342/463
2006/0265127 A1  11/2006  Qu
(Continued)

FOREIGN PATENT DOCUMENTS

CN      1405530 A     3/2003
CN    100356188 C    12/2007
(Continued)

OTHER PUBLICATIONS

Korean Office Action directed to related Korean Patent Application No. 10-2013-0018425, mailed Apr. 24, 2014; 6 pages.
(Continued)

*Primary Examiner* — Mahendra Patel
(74) *Attorney, Agent, or Firm* — Sterne, Kessler, Goldstein & Fox PLLC

(57) ABSTRACT

A wireless communication device capable of more accurately estimating its location in an indoor environment is disclosed. In an indoor environment, the wireless communication device may seek to generate a fingerprint map so as to later identify its location within the environment. However, the map requires the device to at least estimate its current position. Therefore, the device includes one or more sensors to identify each of a bearing and a speed of the device. For example, the speed may be determined based on sensed steps and a stored step length. This information may then be used to estimate the device's location as it moves through the indoor environment.

21 Claims, 6 Drawing Sheets

(56) References Cited

U.S. PATENT DOCUMENTS

| | | | |
|---|---|---|---|
| 2008/0077326 A1* | 3/2008 | Funk et al. | 701/220 |
| 2010/0289659 A1 | 11/2010 | Verbil | |
| 2011/0137608 A1 | 6/2011 | Wang et al. | |
| 2011/0202466 A1* | 8/2011 | Carter | 705/67 |
| 2011/0269479 A1 | 11/2011 | Ledlie | |
| 2011/0291884 A1* | 12/2011 | Oh et al. | 342/357.31 |
| 2012/0218142 A1* | 8/2012 | Leclercq | 342/357.3 |
| 2013/0005355 A1* | 1/2013 | Wirola et al. | 455/456.1 |

FOREIGN PATENT DOCUMENTS

| | | |
|---|---|---|
| CN | 101114018 A | 1/2008 |
| CN | 101183008 A | 5/2008 |
| CN | 101183010 A | 5/2008 |
| KR | 2002-0001257 | 1/2002 |
| KR | 10-2011-0131781 | 12/2011 |
| TW | 201120414 A1 | 6/2011 |
| TW | 201130352 A1 | 9/2011 |
| WO | WO 03/089953 A1 | 10/2003 |

OTHER PUBLICATIONS

English-Language Abstract for Korean Patent Publication No. KR 2002-0001257, published Jan. 9, 2002; 1 page.

English-Language Abstract for Korean Patent Publication No. KR 10-2011-0131781, published Dec. 7, 2011; 2 pages.

Office Action directed to related Taiwanese Patent Application No. 101147556, mailed Sep. 1, 2014; 7 pages.

English-language abstract of Chinese Patent Application Publication No. 101183008 A; 1 page.

Chinese Office Action directed to related Chinese Patent Application No. 201210593679.0, mailed Apr. 30, 2015; 8 pages.

English-Language Abstract for Chinese Patent Publication No, CN100356188C, published Dec. 19, 2007; 1 page.

English-Language Abstract for Chinese Patent Publication No. CN101114018A, published Jan. 30, 2008; 1 page.

English-Language Abstract for Chinese Patent Publication No. CN101183010A, published May 21, 2008; 2 pages.

* cited by examiner

WIRELESS COMMUNICATION DEVICE CAPABLE OF ACCURATELY PERFORMING POSITION ESTIMATIONS

CROSS-REFERENCE TO RELATED APPLICATIONS

The present application claims the benefit of U.S. Provisional Patent Application No. 61/602,999, filed on Feb. 24, 2012, which is incorporated herein by reference in its entirety.

BACKGROUND

1. Field of Invention

The disclosure relates to wireless communications, and more specifically to a wireless communication device capable of accurately estimating its position while within a limited wireless communication environment, and corresponding method.

2. Related Art

Wireless communication devices, such as cellular telephones to provide an example, are becoming commonplace in both personal and commercial settings. The wireless communication devices provide users with access to all kinds of information, as well as the ability to communicate with other such devices across large distances. For example, a user can access the internet through an internet browser on the device, download miniature applications (e.g., "apps") from a digital marketplace, send and receive emails, or make telephone calls using a voice over internet protocol (VoIP). Consequently, wireless communication devices provide users with significant mobility, while allowing them to remain "connected" to communication channels and information.

Wireless communication devices communicate with one or more other wireless communication devices or wireless access points to send and receive data. Typically, a first wireless communication device generates and transmits a radio frequency signal modulated with encoded information. This radio frequency signal is transmitted into a wireless environment and is received by a second wireless communication device. The second wireless communication device demodulates and decodes the received signal to obtain the information. The second wireless communication device may then respond in a similar manner. The wireless communication devices can communicate with each other or with access points using any well-known modulation scheme, including: amplitude modulation (AM), frequency modulation (FM), quadrature amplitude modulation (QAM), phase shift keying (PSK), quadrature phase shift keying (QPSK), and/or orthogonal frequency-division multiplexing (OFDM), as well as any other communication scheme that is now, or will be, known.

Modern wireless communications devices use any of varying methods to obtain their location. By obtaining its location, the wireless communication device can perform location-specific functions and/or operate location-specific applications. In an outdoor environment, the wireless communication device can easily obtain its location through the use of GNSS satellite information. Similarly, triangulation can be easily performed with nearby base stations because those base stations consistently transmit signals at set power levels.

However, in an indoor environment, the device may not have access to GNSS and/or nearby base stations sufficient to make an accurate location determination. Further, although many indoor environments include other communication access points, such as Bluetooth and WiFi, these communication protocols employ fluctuating transmission powers and sleep/hibernate modes. As such, performing conventional location and mapping techniques in an indoor environment will fail to produce accurate results.

BRIEF DESCRIPTION OF THE DRAWINGS/FIGURES

Embodiments are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION OF THE INVENTION

Figure 1:
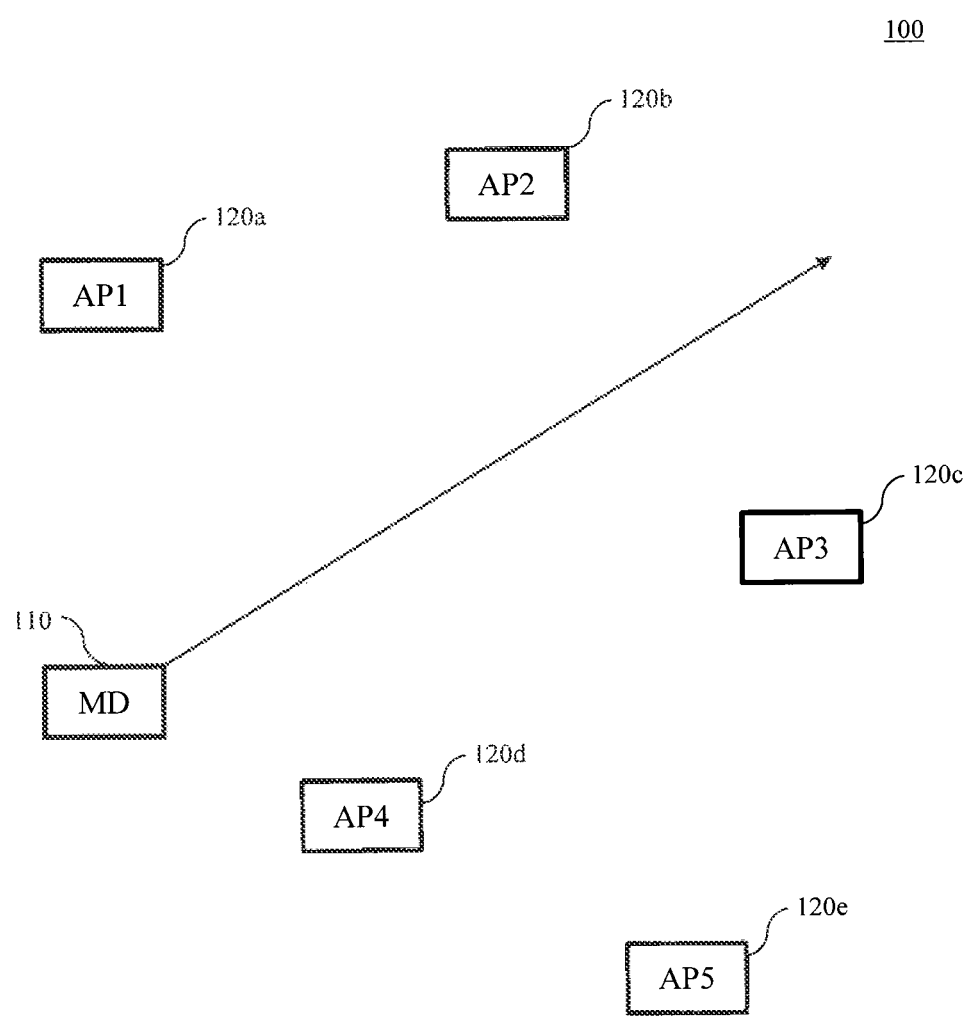
FIG. 1 illustrates a block diagram of an exemplary wireless communication environment.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Further, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer, as described below.

For purposes of this discussion, the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the following description is to be described in terms of Bluetooth and WiFi environments, those skilled in the relevant arks) will recognize that this description may also be applicable to other communications that use other wireless communication methods without departing from the spirit and scope of the present disclosure.

An Exemplary Wireless Communications Environment

FIG. 1 illustrates a block diagram of an exemplary wireless communication environment 100. The wireless communication environment may represent an indoor environment, or some other environment where GNSS signals and/or base station signals are unavailable (hereinafter "limited communication environment").

The wireless communication environment 100 includes a plurality of access points (APs) 120a-120e. The access points 120 may be WiFi and/or Bluetooth access points, and may operate at varying transmission power levels depending on one or more of a plurality of different parameters, including whether the access point 120 is in communication with any devices in the wireless communication environment.

The wireless communication environment 100 also includes a mobile device 110 that seeks to determine its position as it moves through the wireless communication environment 100. As discussed previously, because the wireless communication environment 100 is a limited communication environment, the mobile device 110 cannot determine its location using conventional GNSS based methods.

Figure 2:
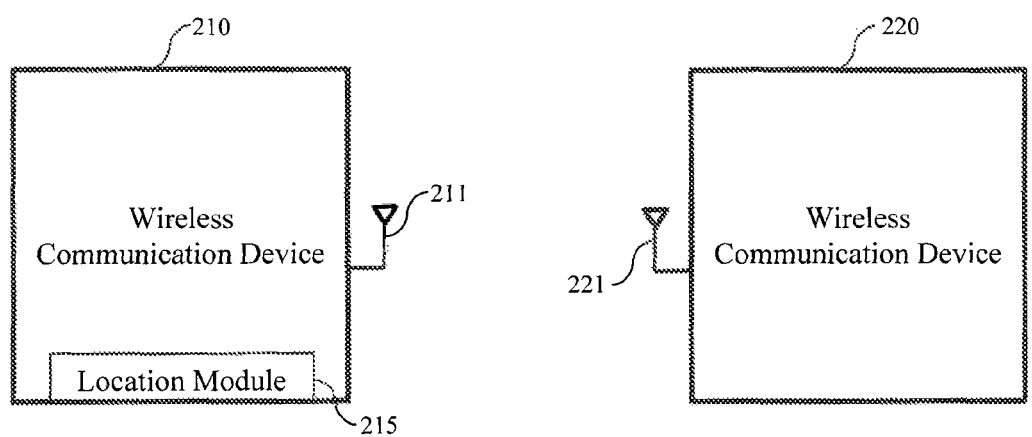
FIG. 2 illustrates a block diagram of an exemplary wireless communication environment that may represent a subset of the previously-described wireless communication environment.

FIG. 2 illustrates an exemplary block diagram of a wireless communication environment 200. The wireless communication environment 200 provides wireless communication of information, such as one or more commands and/or data, between wireless communication devices and may represent a subset of the wireless communication environment 100.

The wireless communication devices may each be implemented as a standalone or a discrete device, such as a mobile telephone, or may be incorporated within or coupled to another electrical device or host device, such as a portable computing device, a camera, or a Global Positioning System (GPS) unit or another computing device such as a personal digital assistant, a video gaming device, a laptop, a desktop computer, or a tablet, a computer peripheral such as a printer or a portable audio and/or video player to provide some examples and/or any other suitable electronic device that will be apparent to those skilled in the relevant art(s) without departing from the spirit and scope of the present disclosure.

The exemplary wireless communication environment 200 includes a first wireless communication device 210 and a second wireless communication device 220. Each of the first wireless communication device 210 and the second wireless communication device 220 may be included within corresponding wireless communication devices that are each capable of both wireless transmission and wireless reception. For purposes of this discussion, the first wireless communication device 210 may represent an exemplary embodiment of the mobile device 110, and the second wireless communication device 220 may represent an exemplary embodiment of an access point 120.

The access point 220 includes an antenna 221 that may include one or more antennas and that is capable of transmitting and/or receiving signals from the wireless communication environment 100. Using its antenna 221, the access point 220 communicates with the mobile device 210. The mobile device 210 also includes an antenna 211 that may include one or more antennas and that is capable of transmitting and/or receiving signals from the wireless communication environment 200.

The mobile device 210 also includes a location module 215. The location module 215 is capable of estimating a location of the wireless communication device 210 within the wireless communication environment 100. The stored or processed position captured from the wireless communication device 210 can be used to perform fingerprint or other mapping to quickly and accurately determine its position at a later time. Details regarding an improved fingerprint mapping configuration of a wireless communication device in a limited communication environment can be found in copending U.S. patent application Ser. No. 13/538780, titled "Wireless Communications Device Capable of Performing Enhanced Fingerprint Mapping and Location Identification", filed herewith, which is incorporated herein by reference in its entirety.

Exemplary Mobile Device

Figure 3:
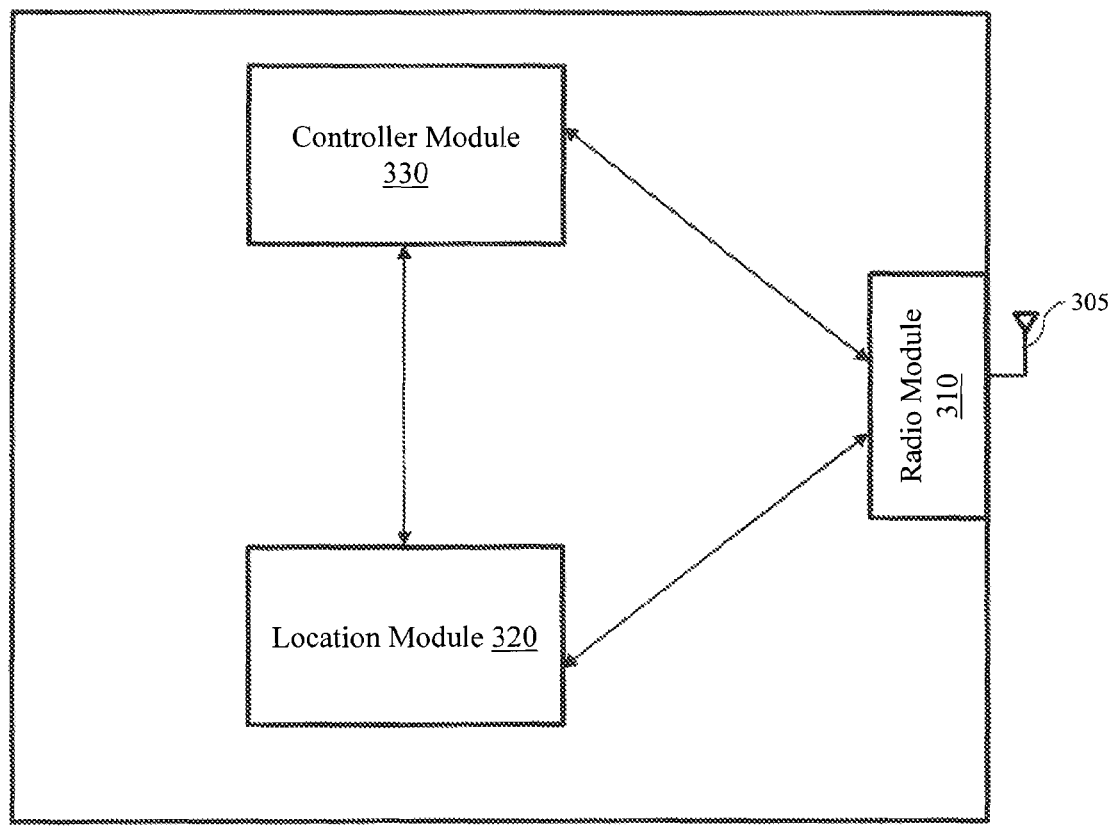
FIG. 3 illustrates a block diagram of an exemplary wireless communication device that may be implemented within the wireless communication environment.

FIG. 3 illustrates a block diagram of an exemplary wireless communication device 300 that may be implemented within the wireless communication environment 100. The wireless communication device 300 includes a location module 320, and may represent an exemplary embodiment of the wireless communication device 110/210.

In the wireless communication device 300, a radio module 310 performs front-end processing of signals received from the wireless communication environment 100 via the antenna 305 and may include signal amplification, filtering, and frequency mixing, among other functionalities. The received signals may include information from one or more nearby access points 120 within the wireless communication environment 100. Once processed, the radio module 310 forwards the received signals to the location module 320.

The location module 320 is configured to estimate a location of the wireless communication device 300. This may be to assist in mapping the wireless communication environment 100 based on the received signals, or simply for location identification. The configuration of the location module 320 is described in further detail below. The location module 320 is in communication with a controller module 330.

The controller module 330 is configured to perform general processing and control functions within the wireless communication device 300. For example, the controller module 330 may coordinate mapping and/or location identification initiation and timing with the location module 320, may perform general signal processing on received signals, may control operations of the various components of the wireless communication device, may prepare signals for transmission by the radio module 310 to the wireless communication environment, and/or may perform location-specific functions based on the location determined by the location module 320.

1. Location Module

Figure 4:
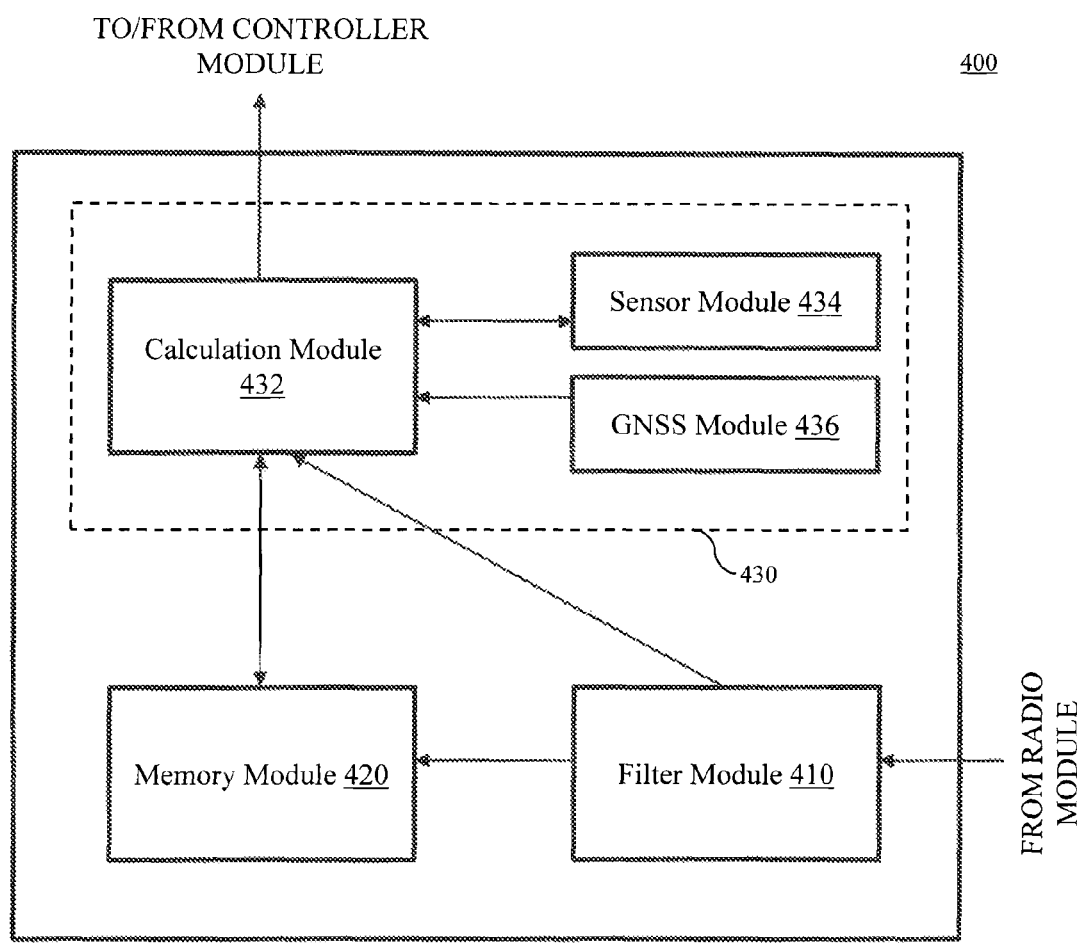
FIG. 4 illustrates an exemplary location module that may be included in the wireless communication device.

FIG. 4 illustrates an exemplary location module 400 that may be included in the wireless communication device 300. The location module 400 includes a position module 430, and may represent an exemplary embodiment of the location module 320.

As discussed above, when in a limited communication environment, the mobile device will not be able to perform traditional GNSS based positioning; nor will it be able to perform fingerprint positioning when RF maps of the limited communication environment is unavailable. Consequently, the device must estimate its location. The estimated location may then be used as the device's current location in other programs, or may be stored, processed, and then applied to another location determining algorithm, such as fingerprint mapping, etc.

The location module 400 receives signals from the radio module 310 at its filter module 410. The filter module 410 may perform different filtering operations on the received signals, such as noise reduction, band filtering, etc. Information obtained from the received signals can then be stored in a memory module 420 for later use. Using the received signals, and the previous information stored in the memory module 420 when the module is around the same location, the location module 400 can employ the position module 430 to perform fingerprint mapping. An improved fingerprint mapping configuration can be found in copending U.S. patent application Ser. No. 13/538780, titled "Wireless Communications Device Capable of Performing Enhanced Fingerprint Mapping and Location Identification", filed herewith, which is incorporated herein by reference in its entirety.

In order to perform the mapping operation, the fingerprint information should be stored in the memory module 420 in association with an estimated location of the wireless communication device 300. Therefore, the position module 430 estimates the location of the wireless communication device 300 as the wireless communication device 300 moves through the wireless communication environment 100. In an embodiment, the estimated position determined by the position module 430 is used for applications such as fingerprint mapping and/or as the actual location of the wireless communication device 300. For purposes of this discussion, the estimated position will be discussed in terms of fingerprint mapping where applicable.

The position module 430 includes a sensor module 434 and a GNSS module 436. In an embodiment, the sensor module 434 includes one or more heading sensors to determine a heading associate with a movement of the wireless communication device. The heading sensors may include one or more of magnetometers, gyroscopes, and others. In an embodiment, the sensor module 434 also includes one or more movement detection sensors, such as an accelerometer, for example, that can detect acceleration (e.g., step movement), and speed when integrated over time. The GNSS module 436 is configured to receive GNSS signals from one or more GNSS satellites for determining a current location and/or speed of the wireless communication device 300.

Calibration

As discussed above, while in the limited communication environment, the wireless communication device 300 likely does not have access to GNSS satellite signals. However, the GNSS module 436 can still be utilized to assist with the location estimation.

Before the wireless communication device 300 enters the limited communication environment, the GNSS module 436 is receiving GNSS satellite signals. The GNSS module 436 forwards the received signals to the calculation module 432, which calculates accurate positions, movement speeds, and headings of the wireless communication device 300.

At the same time, the sensor module 434 outputs signals from its sensors relating to heading and speed of the wireless communication device 300 to the calculation module 432. The calculation module 432 compares the heading and speed information received from the sensor module 434 to the heading and speed information that it calculated from the GNSS signals. Based on the comparison, the calculation module 432 determines an error between the sensor data and the actual speed/heading of the wireless communication device 300.

Based on the calculated error, the calculation module 432 calibrates the sensor module 434. The calculation module 432 can perform the calibration by controlling the sensor module 434 to adjust its signal outputs, by storing the error in memory and adjusting future sensor module 434 outputs using the stored error, or in any other manner within the spirit and scope of the present disclosure. In other words, the GNSS signals may be used as a reference for the calibration of the sensor module, while the GNSS signals are available.

In an embodiment, the position module 430 may utilize a user's steps for estimating location and/or speed of the wireless communication device 300 when in the limited communication environment. In this case, the position module 430 also calibrates the user's step length based on the output of the sensor module 434. For example, the sensor module 434 may output signals corresponding to steps of the user (as detected by an accelerometer, for example), and the calculation module 432 can determine how many of the user's steps are taken within a predetermined distance, as calculated based on the GNSS signals. From this, the calculation module 432 can determine a step length associated with the user. Once the step length is known, then the accelerometers can be used to calculate a number of steps in a given time period so as to calculate speed as ((step length*number of steps)/time).

In this manner, the position module 430 maintains a sensor module 434 whose sensors are closely calibrated, and therefore will provide accurate outputs when within the limited communication environment.

Transition to Limited Wireless Communication Environment

As discussed above, calibration of the sensors takes place in a non-limited communication environment. In order to prepare for transitioning to a limited communication environment, the calculation module 432 also stores various parameters in the memory module 420. For example, the calculation module 432 stores a current position, speed, and/or heading in the memory module 420 that were determined when GNSS signals were available.

As the wireless communication device 300 enters the limited communication environment, the calculation module 432 can identify the transition based on one or more conditions. For example, the radio module 310 may no longer be able to maintain connectivity with cellular base stations and/or the GNSS module 436 may no longer be able to receive GNSS satellite signals with sufficient signal strength.

When the calculation module 432 identifies from the conditions that the wireless communication device 300 has transitioned to the limited communication environment, the calculation module 432 uses the current position, speed, and/or heading as a basis, and begins estimating the position of the wireless communication device 300 using the data output from the sensor module 434.

Estimating Location

In the limited environment, the calculation module 432 receives heading information from the sensor module 434 to determine a movement direction of the wireless communication device 300. The calculation module 432 also receives speed information from the sensor module 434 to determine a speed at which the wireless communication device 300 is moving. The speed information may be derived from the sensor module 434 as acceleration information from an accelerometer, for example, and can be converted to speed information by mathematical integration over time.

Using a previously-stored position, speed, and/or other parameter, the calculation module 432 calculates a new position of the wireless communication device based on data received from the sensor module 434. For example, the calculation module 432 may utilize the following equations to determine a new estimated position:

$$\text{lat}(i) = \text{lat}(i-1) + s \cdot \cos(\theta(i)); \text{ and} \quad (1)$$

$$\text{lon}(i) = \text{lon}(i-1) + s \cdot \sin(\theta(i)), \quad (2)$$

where lat(i) is a current latitude of the device, lat(i−1) is the previously-stored latitude of the device, lon(i) is a current longitude of the device, lon(i−1) is the previously-stored longitude of the device, s is the distance traveled by the device (second integration of the detected acceleration), and θ is the current heading of the device.

The calculation module 432 may perform these calculations at predetermined intervals, or after the occurrence of predetermined events.

As discussed above, the calculation module 432 may base its speed calculation on the number of steps taken by a user of the wireless communication device 300. In this instance, the calculation module 432 substitutes s in the above equations (1) and (2) with:

$$S(i) = \text{NumStep} \cdot \text{StepSize}, \quad (3)$$

where NumStep is the number of steps taken from epoch i−1 to epoch i, and StepSize is the step size of the user as previously calculated during calibration.

In this case, the equations (1) and (2) can modified to be:

$$\text{lat}(i) = \text{lat}(i-1) + S(i) \cdot \cos(\theta(i)); \text{ and} \quad (4)$$

$$\text{lon}(i) = \text{lon}(i-1) + S(i) \cdot \sin(\theta(i)). \quad (5)$$

In an embodiment, after calculating a most recent position of the wireless communication device 300, the calculation module 432 stores this most recent information in the memory module 420 for use in later iterations of the position estimation calculation. In another embodiment, when the positions are being estimated for use with a fingerprint mapping configuration, the calculation module 432 stores the estimated position together with the fingerprint information corresponding to that position in the memory module 420.

Recalibration in the Limited Communication Environment

Because the above-described estimates are being made with respect to sensory signal information, the accuracy of the position estimates may degrade the longer the device remains in the limited communication environment.

When the wireless communication device 300 is performing fingerprint mapping, the memory module 420 stores a plurality of estimated locations in correspondence with wireless fingerprint data. As the wireless communication device 300 moves through the limited communication environment, new fingerprint information is repeatedly being acquired. This fingerprint information is substantially unique for each location in the environment.

Therefore, in order to recalibrate the position of the wireless communication device 300, upon receipt of new fingerprint information, the calculation module 432 compares the new fingerprint information to the stored fingerprint information stored in the memory module 420. This may be performed by correlation, for example. When the current fingerprint information correlates closely with previously-stored fingerprint information, the calculation module 432 may determine that the previously-stored location (corresponding to the previously-stored fingerprint to which the current fingerprint correlates) is the current location of the device.

To enhance position accuracy at time of the recalibration, the calculation module 432 can also compare the current calculated position of the device with the previously-stored position. The calculation module 432 may then choose to set the current location of the device to the previously-stored location only if the difference between the two locations is less that some predetermined threshold. This threshold value may be set to a value, or may be set to change based on a predetermined equation. For example, the threshold may be set to increase based on an increase in the amount of time since the last recalibration.

To even further enhance the accuracy of the positioning, the calculation module 432 can set, as the current location of the device, a position calculated based on the combined location information. The calculation module 432 may perform Kalman filtering to combine the various types of location information in order to arrive at a more accurate position of the wireless communication device 300.

By recalibrating the position of the device in this manner, the location module 400 can more accurately estimate positions of the device in the limited communication environment regardless of the length of time the device is within the limited communication environment.

Figure 5:
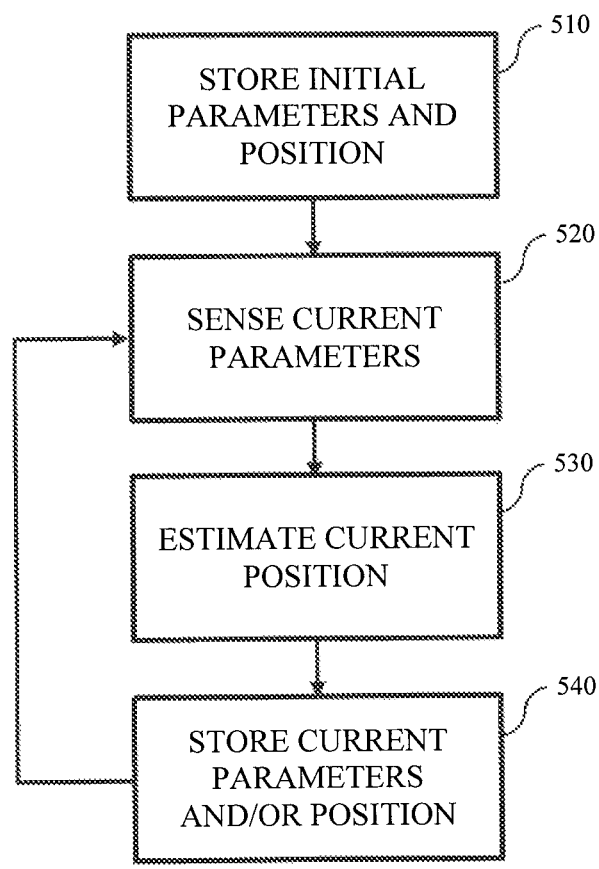
FIG. 5 illustrates an exemplary method of estimating a current location by the wireless communication device.

Exemplary Method of Estimation a Position of a Wireless Communication Device Within a Limited Communication Environment FIG. 5 illustrates an exemplary method of estimating a current location by a wireless communication device.

In this method, the wireless communication device stores initial parameters and an initial position (510). This initial information is preferably determined prior to entering the limited communication environment. The parameters may include an initial heading and/or speed. After entering the limited communication environment, the device employs one or more sensors to detect a current set of parameters (520). These current parameters may include a current heading and/or speed of the device (which may be derived based on acceleration information, or which may be derived into distance information).

Once the current parameters have been obtained the device estimates a current position of the device based on the parameters and the previously-stored position (530). In some cases, the previously-stored position may be the initial position. In an embodiment, the position can be estimated by determining the change from the previously-stored position based on the current parameters. In another embodiment, the position can be further calculated by comparing current fingerprint information to previously-stored fingerprint information and its corresponding locations.

After estimating the current position, the device stores the current position along with any additional parameters that may later be needed into memory (540). The method then repeats the sensing (520), estimating (530), and storing (540) steps at predetermined or otherwise determined intervals.

Those skilled in the relevant art(s) will recognize that the above method can additionally or alternatively include any of the functionality of the wireless communication device 300 and/or location module 400 discussed above, as well as any of its modifications. Further, the above description of the exemplary method should neither be construed to limit the method nor the description of the wireless communication device 300 and/or the location module 400.

Exemplary Computer System Implementation

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 6:
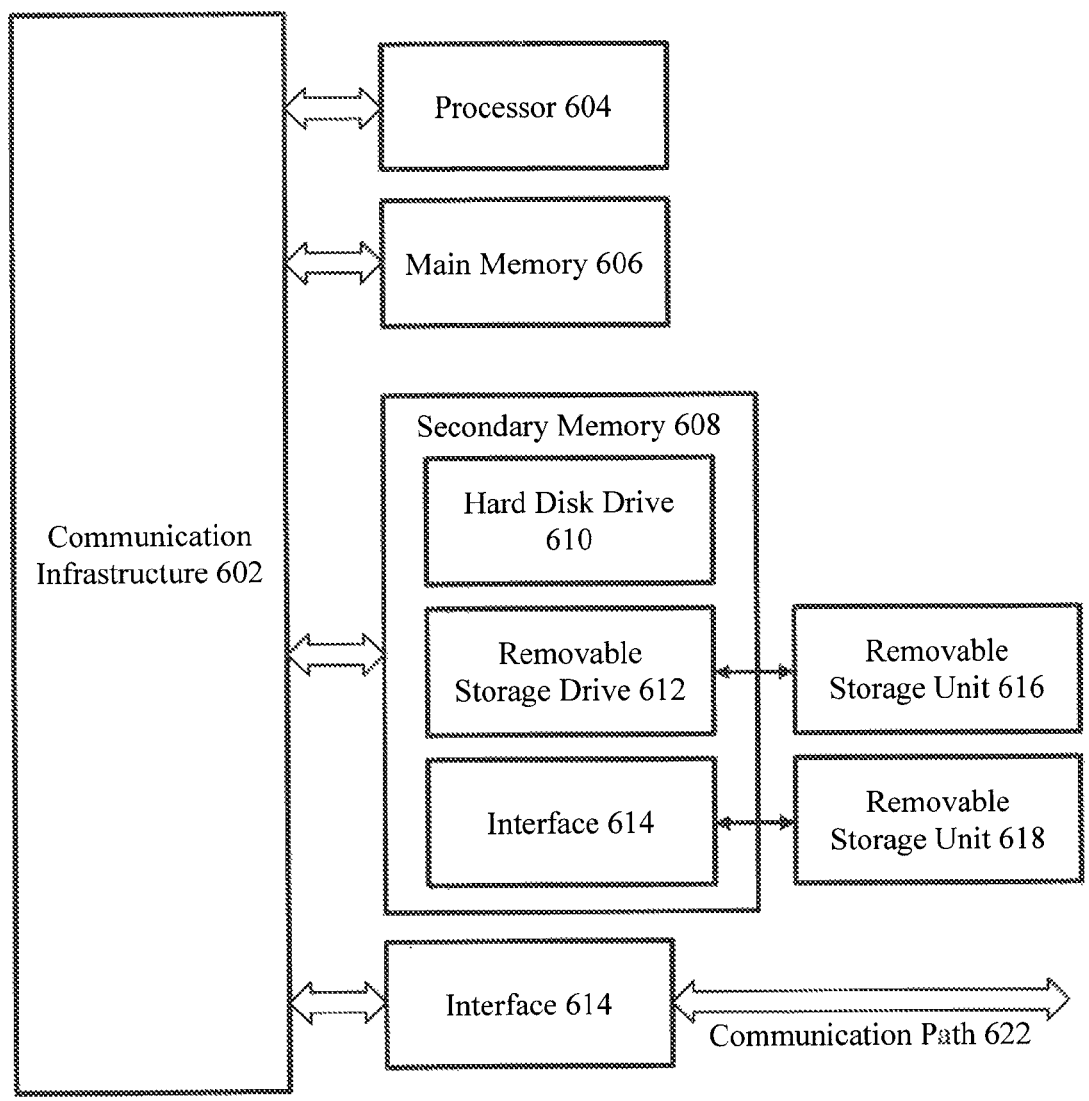
FIG. 6 illustrates an exemplary computer system that can be used to implement aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 600 is shown in FIG. 6. One or more of the modules depicted in the previous figures can be at least partially implemented on one or more distinct computer systems 600, including, for example, the location module 320/400.

Computer system 600 includes one or more processors, such as processor 604. Processor 604 can be a special purpose or a general purpose digital signal processor. Processor 604 is connected to a communication infrastructure 602 (for example, a bus or network). Various software implementations are described in terms of this exemplary computer system. After reading this description, it will become apparent to a person skilled in the relevant art(s) how to implement the disclosure using other computer systems and/or computer architectures.

Computer system 600 also includes a main memory 606, preferably random access memory (RAM), and may also include a secondary memory 608. Secondary memory 608 may include, for example, a hard disk drive 610 and/or a removable storage drive 612, representing a floppy disk drive, a magnetic tape drive, an optical disk drive, or the like. Removable storage drive 612 reads from and/or writes to a removable storage unit 616 in a well-known manner. Removable storage unit 616 represents a floppy disk, magnetic tape, optical disk, or the like, which is read by and written to by removable storage drive 612. As will be appreciated by persons skilled in the relevant art(s), removable storage unit 616 includes a computer usable storage medium having stored therein computer software and/or data.

In alternative implementations, secondary memory 608 may include other similar means for allowing computer programs or other instructions to be loaded into computer system 600. Such means may include, for example, a removable storage unit 618 and an interface 614. Examples of such means may include a program cartridge and cartridge interface (such as that found in video game devices), a removable memory chip (such as an EPROM, or PROM) and associated socket, a thumb drive and USB port, and other removable storage units 618 and interfaces 614 which allow software and data to be transferred from removable storage unit 618 to computer system 600.

Computer system 600 may also include a communications interface 620. Communications interface 620 allows software and data to be transferred between computer system 600 and external devices. Examples of communications interface 620 may include a modem, a network interface (such as an Ethernet card), a communications port, a PCMCIA slot and card, etc. Software and data transferred via communications interface 620 are in the form of signals which may be electronic, electromagnetic, optical, or other signals capable of being received by communications interface 620. These signals are provided to communications interface 620 via a communications path 622. Communications path 622 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 616 and 618 or a hard disk installed in hard disk drive 610. These computer program products are means for providing software to computer system 600.

Computer programs (also called computer control logic) are stored in main memory 606 and/or secondary memory 608. Computer programs may also be received via communications interface 620. Such computer programs, when executed, enable the computer system 600 to implement the present disclosure as discussed herein. In particular, the computer programs, when executed, enable processor 604 to implement the processes of the present disclosure, such as any of the methods described herein. Accordingly, such computer programs represent controllers of the computer system 600. Wnere the disclosure is implemented using software, the software may be stored in a computer program product and loaded into computer system 600 using removable storage drive 612, interface 614, or communications interface 620.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the invention should not be limited by any of the above-described exemplary embodiments, but should be defined only in accordance with the following claims and their equivalents.

What is claimed is:

1. A wireless communication device capable of estimating a position of the wireless communication device in a limited communication environment, the wireless communication device comprising:
a Global Navigation Satellite System (GNSS) module configured to receive GNSS signals prior to entering the limited communication environment;
a sensor module configured to sense heading and speed information of the wireless communication device within the limited communication environment; and
a calculation module configured to:
calibrate the heading and speed information sensed by the sensor module based on the received GNSS signals prior to entering the limited communication environment;
determine an initial position based on the GNSS signals; and
estimate the position of the wireless communication device based on the calibrated heading and speed information and the initial position.

2. The wireless communication device of claim 1, wherein the sensor module includes an accelerometer for generating the speed information and at least one of a gyroscope and a magnetometer for generating the heading information.

3. The wireless communication device of claim 2, wherein the speed information includes a step count associated with a user of the wireless communication device.

4. The wireless communication device of claim 1, wherein the calculation module is configured to calibrate the sensor module by adjusting one or more parameters derived from the sensor module based on the heading and speed information of the wireless communication device determined from the GNSS signals received by the GNSS module.

5. The wireless communication device of claim 1, further comprising a memory module configured to store a most recent position estimate calculated by the calculation module, wherein the calculation module is configured to estimate the position of the wireless communication device at predetermined intervals based on the stored most recent position estimate.

6. The wireless communication device of claim 1, further comprising:
a radio module configured to generate a wireless communication fingerprint each time the calculation module estimates the position of the wireless communication device; and
a memory module configured to store the wireless communication fingerprint together with the corresponding position estimate.

7. The wireless communication device of claim 1, wherein the calculation module is configured to set a current position of the wireless communication device to a stored position estimate when a current wireless communication fingerprint correlates to a stored wireless communication fingerprint within a predetermined threshold.

8. A wireless communication device, comprising:
a sensor module configured to sense movement information of the wireless communication device as the wireless communication device moves through a limited communication environment;
a Global Navigation Satellite System (GNSS) module configured to receive GNSS signals prior to entering the limited communication environment;
a calculation module configured to:
calibrate the movement information sensed by the sensor module based on the received GNSS signals prior to entering the limited communication environment; and
estimate a position of the wireless communication device at predetermined intervals within the limited communication environment based on the calibrated sensed movement information and a predetermined starting position.

9. The wireless communication device of claim 8, wherein the predetermined starting position is initially determined based on GNSS data received prior to entering the limited communication environment, and
wherein the predetermined starting position is subsequently determined based on a previously estimated position within the limited communication environment.

10. The wireless communication device of claim 8, wherein the sensor module includes an accelerometer for measuring speed information and at least one of a magnetometer and a gyroscope for measuring heading information, and
wherein the movement information includes the speed information and the heading information.

11. The wireless communication device of claim 8, further comprising:
a radio module configured to generate a wireless communication fingerprint at each predetermined interval; and
a memory module configured to store each wireless communication fingerprint together with its corresponding position estimate.

12. The wireless communication device of claim 11, wherein the calculation module is configured to compare a current wireless communication fingerprint with the stored wireless communication fingerprints and set a current position of the wireless communication device to either an estimated position or a previously-stored position based on the comparison.

13. The wireless communication device of claim 10, wherein the speed information is based on a step count of a user carrying the wireless communication device.

14. A method of estimating a position of a wireless communication device within a limited communication environment, the method comprising:
calculating an initial position based on information obtained prior to entering the limited communication environment;
sensing, using one or more sensors, movement information of the wireless communication device;
calibrating the movement information sensed by the one or more sensors based on the information obtained prior to entering the limited communication environment; and
estimating, at predetermined intervals, the position of the wireless communication device based on the calibrated movement information and a starting position,
wherein the starting position is the initial position for a first position estimate and is a previous position estimate for subsequent position estimates, and
wherein the information obtained prior to entering the limited communication environment includes: Global Navigation Satellite System (GNSS) signals, signals from one or more base stations, a user step count, initial heading information, or initial speed information.

15. The method of claim 14, wherein the sensing of the movement information includes sensing a step count of a user carrying the wireless communication device and a heading, and wherein the movement information includes the step count and the heading.

16. The method of claim 14, further comprising:
measuring a wireless communication fingerprint at each predetermined interval;
storing each estimated position together with its corresponding wireless communication fingerprint.

17. The method of claim 16, further comprising:
measuring a current wireless communication fingerprint;
comparing the current wireless communication fingerprint to previously-stored wireless communication fingerprints; and
setting a current position of the wireless communication device to one of a current position estimate or a previously-stored position estimate depending on the comparison.

18. The method of claim 17, wherein the current position is set to the previously-stored position estimate, provided that the current wireless communication fingerprint correlates, within a first predetermined threshold, to a previously-stored wireless communication fingerprint, and provided that the current position estimate is within a second predetermined threshold of the previously-stored position estimate,
wherein the previously-stored position estimate corresponds to the previously-stored wireless communication fingerprint.

19. The method of claim 18, wherein the second predetermined threshold increases as an amount of time since the position of the wireless communication device was set to a previously-stored position increases.

20. The method of claim 17, wherein a difference in the current position estimate and the previously-stored position estimate is used to adjust one or more parameters of the one or more sensor modules, and therefore improve one of speed or heading outputs of the one or more sensor modules.

21. The method of claim 14, wherein the calibrating includes setting a step length associated with a user.

* * * * *